(12) United States Patent
Meyer et al.

(10) Patent No.: US 9,284,122 B2
(45) Date of Patent: Mar. 15, 2016

(54) ROLLER FRAME

(71) Applicants: Helmut Meyer, Troisdorf (DE); Andreas Böhm, Troisdorf (DE)

(72) Inventors: Helmut Meyer, Troisdorf (DE); Andreas Böhm, Troisdorf (DE)

(73) Assignee: Reifenhäuser GmbH & Co. KG Maschinenfabrik, Troisdorf (DE)

( * ) Notice: Subject to any disclaimer, the term of this patent is extended or adjusted under 35 U.S.C. 154(b) by 0 days.

(21) Appl. No.: 14/106,428

(22) Filed: Dec. 13, 2013

(65) Prior Publication Data

US 2014/0183005 A1 Jul. 3, 2014

(30) Foreign Application Priority Data

Dec. 21, 2012 (EP) ..................................... 12199014

(51) Int. Cl.
- *B29C 43/58* (2006.01)
- *B65G 13/02* (2006.01)
- *B29C 43/24* (2006.01)

(52) U.S. Cl.
CPC .............. *B65G 13/02* (2013.01); *B29C 43/245* (2013.01); *B29C 43/58* (2013.01); *B29C 2043/5825* (2013.01)

(58) Field of Classification Search
CPC ...... B65G 13/02; B29C 43/58; B29C 43/245; B29C 2043/5825
See application file for complete search history.

(56) References Cited

U.S. PATENT DOCUMENTS

| | | | |
|---|---|---|---|
| 1,989,038 A * | 1/1935 | Brown .................. | B29C 43/245 100/169 |
| 2,861,504 A | 11/1958 | Kane | |
| 3,240,148 A * | 3/1966 | Varga .................... | B21B 13/023 100/158 R |
| 3,653,320 A * | 4/1972 | Oehlmann .............. | B29C 43/24 100/158 R |
| 4,110,387 A * | 8/1978 | Woeckener ........... | B29C 43/245 264/175 |
| 4,117,054 A * | 9/1978 | Salo ........................ | B21B 13/14 100/168 |
| 4,389,932 A | 6/1983 | Pav | |
| 4,434,713 A | 3/1984 | Hartwich et al. | |
| 4,516,491 A * | 5/1985 | Winter .................. | B21B 13/023 100/158 R |
| 4,635,861 A * | 1/1987 | Resch ....................... | B02C 4/36 100/158 R |
| 4,986,177 A * | 1/1991 | Masek .................... | B29C 43/24 100/163 R |
| 5,247,331 A * | 9/1993 | Rydelek ............. | G03G 15/0126 399/226 |
| 5,295,803 A * | 3/1994 | Ogawa .................. | B29C 43/245 100/331 |
| 5,456,871 A * | 10/1995 | Harada .................. | B29C 43/245 264/175 |
| 6,851,356 B2 * | 2/2005 | Haag ...................... | D21G 1/008 100/163 R |
| 2009/0044382 A1* | 2/2009 | Schmitz ............... | D01G 31/006 19/239 |
| 2009/0295017 A1 | 12/2009 | Sano et al. | |

FOREIGN PATENT DOCUMENTS

| | | |
|---|---|---|
| DE | 30 04 913 A1 | 8/1981 |
| DE | 35 27 765 A1 | 2/1987 |
| DE | 195 44 988 A1 | 6/1997 |

* cited by examiner

*Primary Examiner* — Gene Crawford
*Assistant Examiner* — Thomas Randazzo
(74) *Attorney, Agent, or Firm* — Pauley Erickson & Kottis

(57) ABSTRACT

A roller frame including at least two rollers mounted in a housing between which a nip can be formed. The ends of the rollers are supported in rotary fashion in bearings and at least one of the rollers is embodied as an advancing roller and has an adjusting system by which it is possible to move the bearings of the advancing roller, thus changing the nip. The adjusting system has a rack and a pinion whose teeth engage with those of the rack and can be driven to rotate by a motor. It is possible to change the distance between the pinion and the rack by changing the tooth engagement depth between them.

20 Claims, 5 Drawing Sheets

ROLLER FRAME

BACKGROUND OF THE INVENTION

1. Field of the Invention

This invention relates to a roller frame, including at least two rollers mounted in a housing, between which a nip can be formed. The ends of the rollers are supported in rotary fashion in bearings and at least one of the rollers an advancing roller and has an adjusting system by which the bearings of the advancing roller can be moved, thus changing the nip.

2. Discussion of Related Art

Roller frames of this kind are used, for example, in the manufacture of plastic sheets and plates. A typical example of use are so-called calender stacks in which a molten mass produced in an extrusion process, after emerging from a sheet die, is guided through an adjustable calender nip between two rollers. The molten mass is cooled in the process and shaped in such a way that a sheet web is produced with a uniform thickness and a homogeneous appearance across the entire sheet surface. So-called calendered sheets of this kind are made, for example, of polystyrene, polypropylene, or polyester and are used among, other things for transporting and protecting foods and are also used in the automotive industry.

Generally, a calender stack includes at least two rollers, one of which is stationary and at least one other roller is embodied as an advancing roller. This advancing roller can be moved by an adjusting system so that different calender nip settings can be produced between the stationary roller and the adjustable roller. In this way, it is possible to produce sheets of different thicknesses.

Known calender stacks are usually equipped with a hydraulic adjusting system, which has various disadvantages. The hydraulic fluid used in them, typically oil, contaminates the sheet webs when leaks occur, thus rendering them unusable. Also, the use of hydraulic fluid that must be regularly replaced is expensive and the corresponding apparatus takes up a relatively large amount of space. Finally, hydraulic systems frequently cannot be controlled with the required degree of precision so that additional measuring devices must be used for determining the calender tip that has been set and for readjusting it as needed.

U.S. Pat. No. 4,414,713 A discloses a calender with a plurality of rollers in which the pressing force of the top roller on the other rollers situated below it can be produced by an adjusting mechanism composed of a rack-and-pinion system. The nip is adjusted by the bottom roller, which is acted on by hydraulic, cylinders.

U.S. Pat. No. 2,861,504 A and U.S. Pat. No. 1,989,038 A describe calenders with an adjusting device for the rollers that acts by a spindle/spindle nut system. Systems of this kind, with a spindle and a spindle nut traveling on it, however, have an inevitably large amount of play in both adjustment directions in order to ensure adjustability, which makes such designs unsuitable for precise nip adjustment, such as in a calender stack.

SUMMARY OF THE INVENTION

One object of this invention is to provide a roller frame that overcomes the above-described disadvantages of the prior art and permits a high-precision, ideally play-free adjustment of the nip.

This object and others are attained with a roller frame with features described in different embodiments and modifications of this invention, as set forth in this specification and in the claims.

According to this invention, the adjusting system used to adjust the nip has a rack and a pinion, which engages with the teeth of the rack and can be driven in rotary fashion by a motor. The distance between the pinion and the rack can be changed by changing the tooth engagement depth between them.

In other words, one core concept of this invention is that the hydraulic system used up to now for advancing the rollers is replaced by an electromechanical system. Systems of this kind, according to this invention have a rack and pinion, are superior to conventional hydraulic systems with regard to an exact positioning and represent an economical alternative to them.

In particular, a rack engages a bearing of the advancing roller and cooperates with a motor-drivable pinion so that the rotating motion or the motor and pinion is converted into a linear motion of the rack and thus a linear motion of the bearing of the advancing roller. Depending on the rotation direction of the motor, the advancing roller can be moved toward or away from a stationary roller in order to change the nip. The corresponding sets of teeth of the rack and pinion are embodied to enable a precise setting of the adjustment path. It is thus possible to convert minimal adjustment paths in the µm range.

With this invention, there is adjustability of the distance between the pinion and the rack, and it is possible to adjust the tooth engagement depth between these two engaged parts of the adjusting device. Usually the tooth engagement depth between a pinion and a corresponding rack is set to a predetermined dimension, which, because of the then prevailing tooth flank play, ensures the freedom of motion of the pinion teeth in the teeth of the rack when the pinion is rotated by the associated motor. But if, for example, after reaching the desired position, the depth of the tooth engagement increases because of the distance between the pinion and the rack is correspondingly reduced, then the existing tooth flank play is also reduced and in the ideal case, almost completely eliminated.

This invention uses the above-described effect in order to ensure ease of adjustment by the intrinsically advantageous rack-and-pinion system and to eliminate the play in the adjusting device. Thus, the play in experiments was reduced to less than $\frac{1}{100}$ mm.

If it becomes necessary to change the nip again, the tooth engagement depth and the accompanying tooth flank play can first be change by increasing the distance between the pinion and the rack back to a usual distance and then, the pinion can be rotated in order to travel the desired adjustment path, after which the process of eliminating the play begins again.

Because an adjustment is only required infrequently, the adjusting device can also be used to perform a long-lasting, adjustment since even with the play eliminated, an adjustment is still possible.

In an alternative embodiment of this invention, the pinion and the motor are mounted on the housing with the interposition of a replaceable spacer plate so that the thickness of the spacer plate defines the distance between the pinion and the rack. By selecting a thickness of the spacer plate or by carrying out a corresponding remachining of this plate, such as by mechanical material removal, it is possible to eliminate the play inside adjusting devices by the desired amount.

According to one embodiment of this invention, the distance between the pinion and the rack can be changed by a cam mechanism which the pinion and which when actuated, such as by a hand crank or a controllable drive unit, produces the desired change in the distance of the pinion from the rack.

It is also possible for the distance between the pinion and the rack to be releasably fixable in order to ensure stable adjustment states. In this way, it is also possible to produce a prestressing of the pinion in relation to the rack in order to completely eliminate the play between them. They can also be provided with suitable coatings, such as a PVD coating, in order to minimize friction and wear, for example.

According to one embodiment of this invention, the rack and the pinion are embodied with a helical gearing in order to provide larger flank support areas.

In addition, the rack can be hardened, ground and honed in order to achieve a favorable degree at durability.

According to one embodiment of this invention, two bearings of the advancing roller are each provided with a respective adjusting system according to this invention, including a rack, a pinion, and the associated drive motor. Preferably the two adjusting systems are centrally controllable so that it is possible to produce a very precise parallel travel of the roller and to thus achieve an adjustment of a nip with uniform dimensions across the entire length of the roller.

According to another embodiment of this invention, a transmission is provided between the pinion and the motor of the adjusting system. With such a transmission, it is possible, for example, to introduce a speed transformation into the drive. In one embodiment of this invention, the transmission is embodied in the form of a planetary gear with a high torsional stiffness and a low flank making it possible to achieve particularly large speed transformations.

According to one embodiment of this invention, the motor driving the pinion is a servomotor, in addition to a compact design, servomotors feature a very good regulating behavior and make it possible to approach a target position with a precision down to the micrometer.

In another embodiment of the roller frame according to this invention, three rollers are provided, at least two of which are embodied as advancing rollers. With such an arrangement, it is possible for two nips to be adjusted and for a sheet web that is to be calendered, for example, to be guided through the two calender nips in succession, thus making it possible to achieve particularly good results in the calendering process.

Finally, the roller frame according to this invention can also permit so-called ax-crossing in which, ill order to compensate for the inevitable roller deflections, an advancing roller is supported so that it can be moved crosswise relative to the nonadjustable roller. In other words, the idealized center lines of these two rollers no longer extend parallel, but rather extend slightly crosswise to each other, making it possible to set a constant nip between the two rollers regardless of the deflection.

BRIEF DESCRIPTION OF THE DRAWINGS

This invention is explained in greater detail in view of exemplary embodiments and with reference to the accompanying drawings, wherein:

FIG. 5b shows the side view of the device according to FIG. 5a.

DETAILED DESCRIPTION OF THE INVENTION

Figure 1:
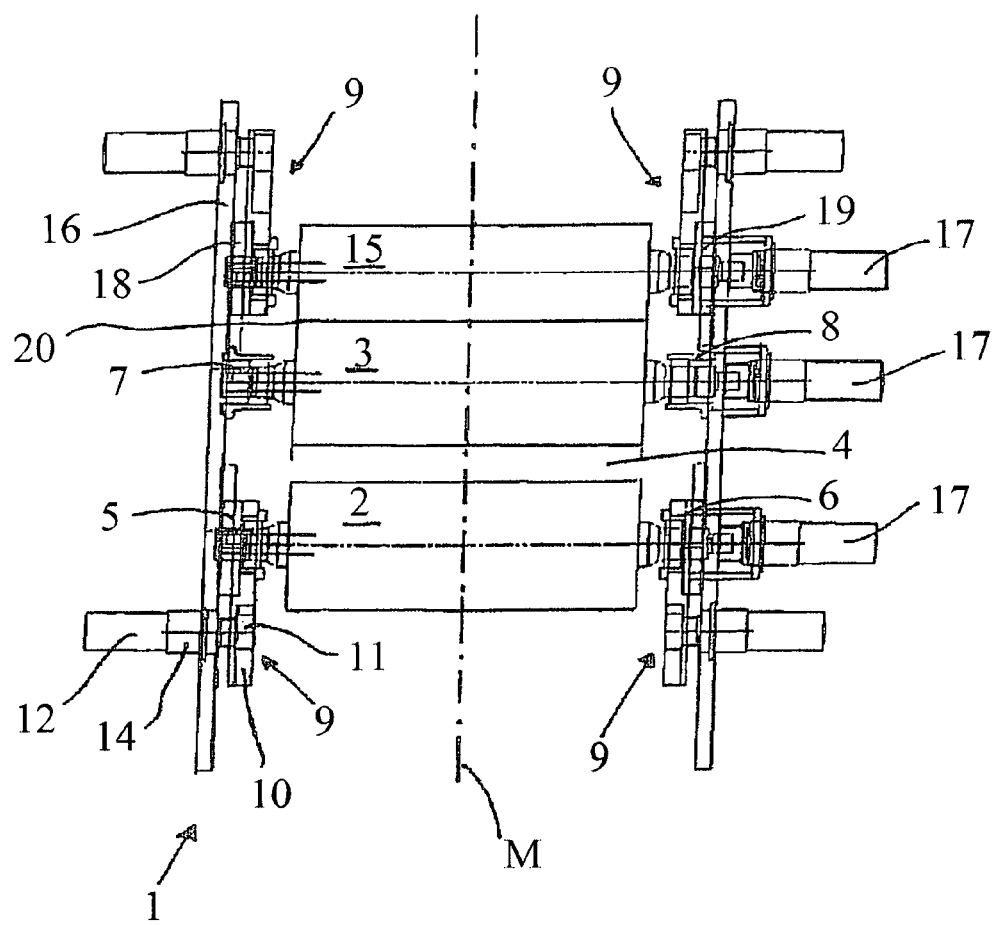
FIG. 1 is a schematic top view of a roller frame according to this invention.
Figure 2:
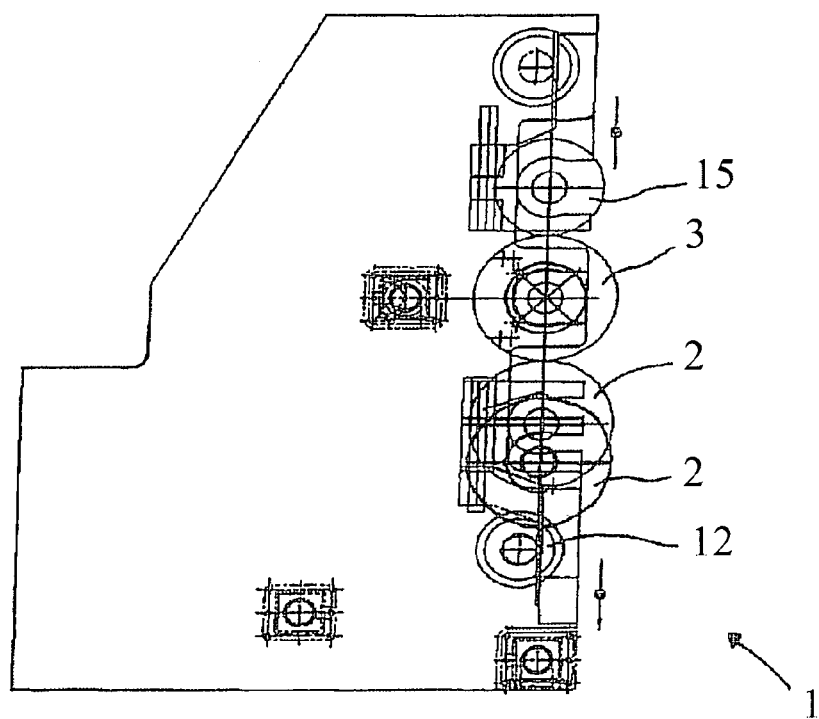
FIG. 2 is a schematic side view of the roller frame from FIG. 1.

FIGS. 1 and 2 show a roller frame, labeled as a whole with the numeral 1, of a calender stack, which includes three parallel rollers 3, 15 that are mounted in a frame 16. AU three rollers 2, 3, 15 are mounted to the frame 16 at their ends by respective bearings 5, 6, 7, 8, 18, 19 in which they are supported in rotary fashion. Each of the three rollers 2, 3, 15 has its own drive motor 17 by which it can be set into rotation.

The roller 3 located in the middle is a stationary roller while the two rollers 2, 15 are embodied in the form of advancing rollers. The two advancing rollers are each equipped with a respective adjusting system 9 at each end, with which the respective bearings 5, 6, 18, 19, together with the rollers 2, 15 mounted in them, can be moved along the frame 16 in linear fashion.

By moving the bearings 5, 6, 18, 19, it is possible to adjust a between the rollers 2 and 3 and a nip 20 between the rollers 3 and 15.

The following description of the design and function of the adjusting system 9 is limited to the adjusting system 9 for moving the bean 5 of the roller 2 shown at the bottom left in FIG. 1. Due to the symmetry of the design of the roller frame, this same description also applies in corresponding fashion to the adjusting system 9 located at the other end of roller 2 and for the two adjusting systems 9 that control the position of roller 15.

The adjusting system 9 has a rack 10 and a pinion 11 cooperating with the rack. The rack 10 engages with the bearing 5. By a servomotor 12 and an interposed planetary gear 14, the pinion 11 can be driven into rotation, thus causing the rack 10 and together with it, the bearing 5 to be moved in linear fashion and guided by the support structure 16. Depending on the rotation direction of the servomotor 12, the movement travels toward or away from the stationary roller 3. Through the use of a servomotor, it is thus possible to approach a desired position with a high degree of precision.

In order to be able to move and position the roller 2 so that is exactly parallel to the stationary roller 3, the adjusting systems 9 for producing the advancing motion of the two bearings 5 and 6 are driven synchronously.

As soon the advancing rollers 2, 15 have executed the desired travel path in response to the above-explained actuation of the adjusting system 9, and the nip in relation to the stationary roller 3 has been set to the desired dimension, in order to ensure the most constant possible product quality, each of the adjustable rollers must be supported in as play-free a fashion as possible in order to maintain the nip at the desired dimension even when there is contact pressure between the rollers.

Figure 3:
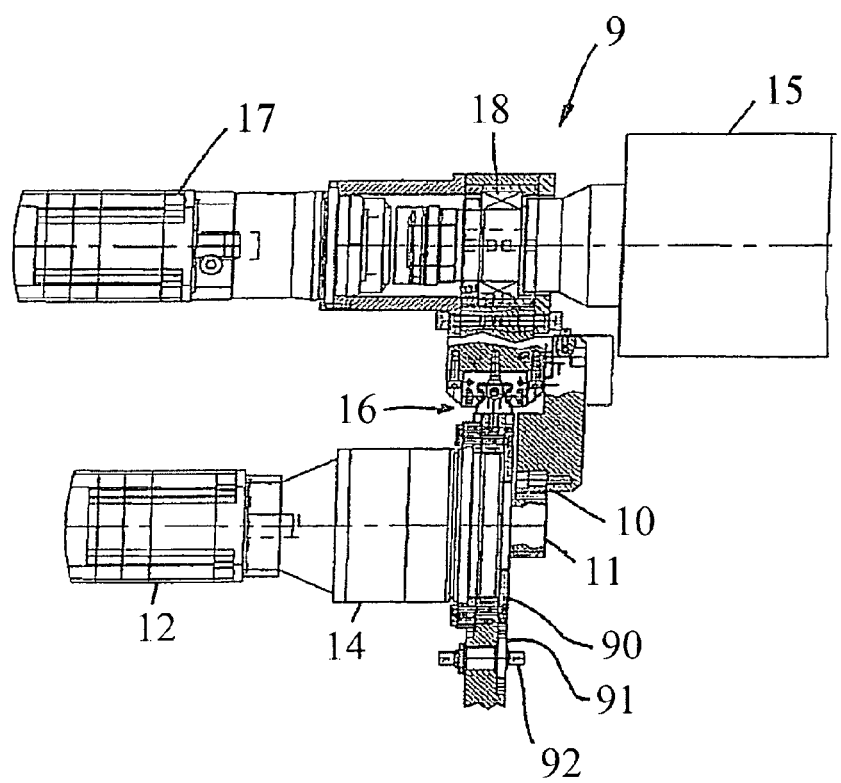
FIG. 3 is a view of a part of the roller frame according to this invention.

For this purpose, the servomotor 12 with its planetary gear 14 and the pinion 11 rotary driven by it, as shown in FIG. 3, are supported in a cam mechanism comprising an annular cam 90 with external gearing and a pinion 91 that engages in the external gearing and which, for example through engagement of a rotating tool (not shown) or a suitable drive motor with the pin 92, can be turned around its own axis and as a result of the tooth engagement, then causes the cam 90 to rotate so to speak.

Figure 4:
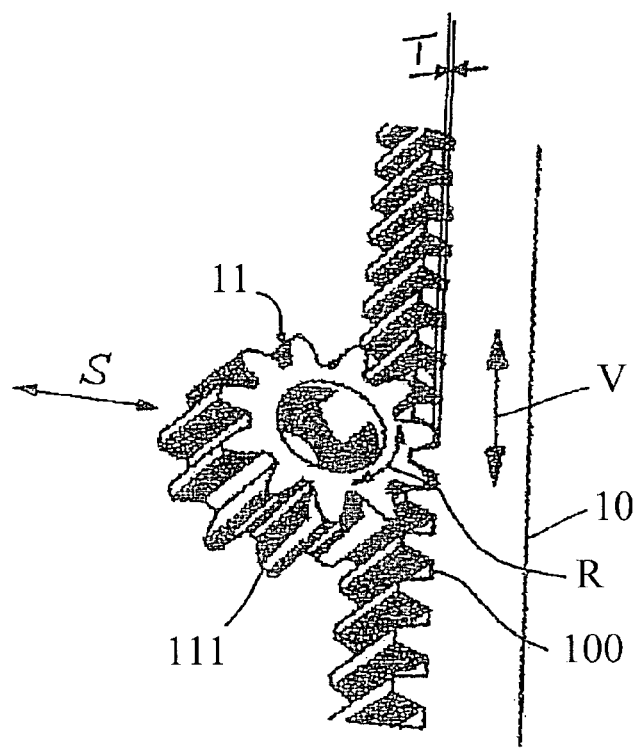
FIG. 4 is a schematic depiction of the principal according to this invention for reducing tooth flank play.

As shown by the schematic depiction in FIG. 4, when the cam 90 is actuated in the one or the other rotation direction, this produces a movement of the pinion 11 that engages with the rack 10, into or away from the tooth root surface 100 of the rack 10, which movement is indicated by the arrow S in FIG. 4.

Consequently, when the actuation of the cam 90 causes the pinion 11 to be moved toward the right in the direction of arrow S, tooth engagement depth of the pinion teeth 111 of the pinion 11 in the rack 10 increases, thus correspondingly reducing the distance T between the pinion 11 and the rack 10. The tooth flank play between the pinion 11 and the rack 10 also decreases correspondingly so that an almost complete freedom from play can be set between the pinion 11 and the rack 10.

If it becomes necessary to actuate the adjust system 9 again in order to change the nip between the advancing roller 2, 5 and the stationary roller 3, then first the cam 90 is rotated by the pinion 91 so that a movement of the pinion 11 toward the left in the direction S according to the depiction in FIG. 4 is produced, as a result of which the increasing distance T between the pinion 11 and rack 10 reduces the tooth engagement depth between the pinion 11 and the rack 10 until there is once again a sufficient amount of tooth flank play to permit easy rotation of the pinion 11 in the direction of the arrow R and as a reaction, a traveling movement in direction V. As soon as the new desired nip has been adjusted in this way, the cam 90 is once again actuated in order to once more reduce the tooth engagement depth to the minimum possible.

Alternatively, the tooth flank play can also be long-lastingly adjusted to a minimum and kept there since even then, it is still possible for the pinion 11 to move in the rack 10. The low set rack play, however, permits a highly precise adjustment of the nip.

When the manufacturing calender stacks sheets, a flow of molten mass produced in a plasticizing unit and emerging from a sheet die is guided into a calender stack according to FIG. 1 and in it, is first guided around the roller 2, then threaded through the nip 4, then guided under the roller 3, through the nip 20, and back around the roller 15. The calender stack is usually followed by a winder, in which the finished sheet is rolled up. The rollers 2, 3, 15 of the calender stack are cooled in order to cool the flow of molten mass.

As shown in FIG. 1, the nip 4 is opened wide, which facilitates the initial threading of a flow of molten mass to be calendered. As soon as the flow of molten mass is guided around the rollers 2, 3, 15 and threaded through the nips 4, 20, the nip 4 can be reduced by moving, the bearings 5, 6 in the above-described way, except for a preset dimension required for the respective calendering process. Such a narrow setting of the calender nip is demonstrated by the example of the nip 20 in FIG. 1. In the side view in FIG. 2, the roller 2, which is embodied as an advancing roller, is shown in two positions situated apart from each other, resulting from corresponding movements.

With a roller frame according to this invention, equipped with a servomotor and a planetary gear, depending on the roller type used, holding forces of up to 500,000 N and movement forces of up to 100,000 N can be exerted. The travel paths that can be produced in this way typically lie between 150 mm and 200 mm, with a positioning precision of between 5 µm and 2 µm.

One advantage of the roller frame according to this invention, equipped with the electromechanical adjusting system, is the exact controllability and simpler operation as compared to a hydraulic system. In addition, the electromechanical system has a more compact design and experiences as lower amount of wear. Because of the precise positionability of the advancing rollers enabled by the system according to this invention, it is in particular possible to dispense with additional measuring and adjusting devices for readjusting the nip so that the use of the electromechanical system also brings economic advantages.

Figure 5A:
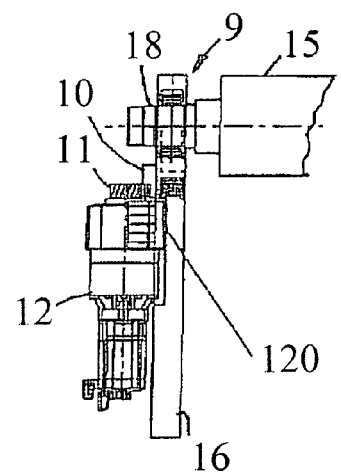
FIG. 5a shows an alternative embodiment of the roller frame according to this invention, in a view similar to that according to FIG. 3.
Figure 5B:
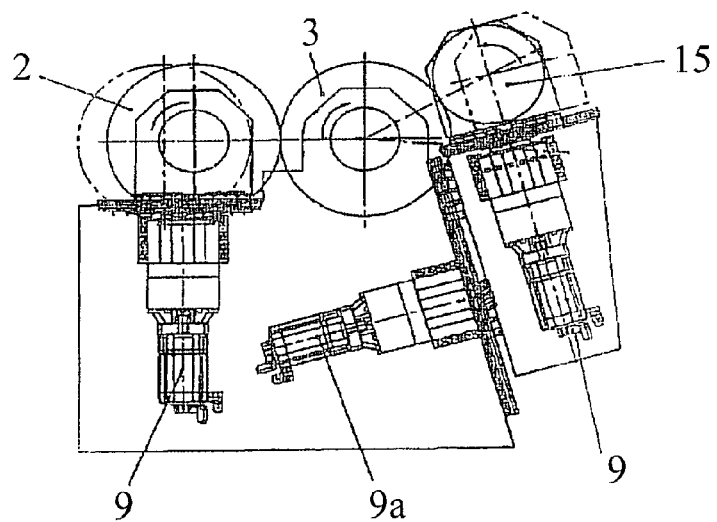

In the embodiment according to FIGS. 5a and 5b, the motor 12 that drives the pinion 11 is mounted on the housing 16 with the interposition of a replaceable spacer plate 120. The thickness of the spacer plate 120 defines the distance between the pinion 11 and the rack 10 and thus the tooth engagement depth at which the pinion teeth of the pinion 11 engage in the rack 10.

If the thickness of the spacer plate 120 is then changed, such as by replacing and/or machining it, then the distance between the pinion 11 and the rack 10 and thus the amount of flank play change. The thinner the spacer plate 120 is, the smaller this play. It is therefore possible to adjust the tooth flank play to the most optimum possible minimum.

Finally, it is also clear from FIG. 5b that in the exemplary embodiment shown, the two advancing rollers 2, 15 are each equipped with an adjusting system 9, but the advancing roller 15 is also equipped with a second adjusting system 9a that is rotated by 90° relative to the adjusting system 9 and can be used to adjust an axial crosswise orientation for the stationary roller 3 in order to compensate for the deflection of the roller.

European Patent Application No. 12199014.7, filed 21 Dec. 2012, the priority document corresponding to this invention, to which a foreign priority benefit is claimed under Title 35, United States Code, Section 119, and its entire teachings are incorporated, by reference, into this specification.

What is claimed is:

1. A roller frame (1), including at least two rollers (2, 3) mounted in a housing (16), between which a nip (4) is formed, ends of the rollers (2, 3) supported in a rotary fashion in bearings (5, 6, 7, 8) and at least one of the rollers (2, 3) being an advancing roller and having an adjusting system (9) by which it is possible to move the bearings (5, 6) of the advancing roller, thus changing the nip (4), the adjusting system (9) comprising a rack (10) and a pinion (11) with pinion teeth engaging with rack teeth of the rack and driveable to rotate by a motor (12), and changing a distance between the pinion (11) and the rack (10) by changing a tooth engagement depth between them, wherein the distance between the pinion (11) and the rack (10) is changed by a cam mechanism acting on the pinion (11).

2. The roller frame (1) according to claim 1, wherein three rollers (2, 3, 15) are provided, of which at least two rollers (2, 15) are advancing rollers each having a respective adjusting system (9) on each of the bearings (5, 6).

3. A roller frame (1), including at least two rollers (2, 3) mounted in a housing (16), between which a nip (4) is formed, ends of the rollers (2, 3) supported in a rotary fashion in bearings (5, 6, 7, 8) and at least one of the rollers (2, 3) being an advancing roller and having an adjusting system (9) by which it is possible to move the bearings (5, 6) of the advancing roller, thus changing the nip (4), the adjusting system (9) comprising a rack (10) and a pinion (11) with pinion teeth engaging with rack teeth of the rack and driveable to rotate by a motor (12), and changing a distance between the pinion (11) and the rack (10) by changing a tooth engagement depth between them, wherein the pinion (11) and the motor (12) are mounted on the housing (16) with the interposition of a replaceable spacer plate (120) and a thickness of the spacer plate (120) defines a distance between the pinion (11) and the rack (10).

4. The roller frame (1) according to claim 3, wherein the distance between the pinion (11) and the rack (10) is releasably fixable.

5. The roller frame (1) according to claim 4, wherein the advancing roller has a respective adjusting system (9) on each of the bearings (5, 6).

6. The roller frame (1) according to claim 5, wherein the two adjusting systems (9) of the advancing roller are centrally controllable.

7. The roller frame (1) according to claim 6, wherein a transmission (14) is provided between the pinion (11) and the motor (12) of the adjusting system (9).

8. The roller frame (1) according to claim 7, wherein the transmission (14) is a planetary gear.

9. The roller frame (1) according to claim 8, wherein the motor (12) is a servomotor.

10. The roller frame (1) according to claim 8, wherein three rollers (2, 3, 15) are provided, of which at least two rollers (2, 15) are advancing rollers.

11. The roller frame (1) according to claim 10, wherein at least one of the advancing rollers (2, 15) is supported so that it can be moved crosswise relative to the roller (2) to compensate for the deflection.

12. A roller frame (1), including at least two rollers (2, 3) mounted in a housing (16), between which a nip (4) is formed, ends of the rollers (2, 3) supported in a rotary fashion in bearings (5, 6, 7, 8) and at least one of the rollers (2, 3) being an advancing roller and having an adjusting system (9) by which it is possible to move the bearings (5, 6) of the advancing roller, thus changing the nip (4), the adjusting system (9) comprising a rack (10) and a pinion (11) with pinion teeth engaging with rack teeth of the rack and driveable to rotate by a motor (12), and changing a distance between the pinion (11) and the rack (10) by changing a tooth engagement depth between them, wherein the distance between the pinion (11) and the rack (10) is releasably fixable.

13. The roller frame (1) according to claim 12, wherein the advancing roller has a respective adjusting system (9) on each of the bearings (5, 6).

14. The roller frame (1) according to claim 13, wherein the two adjusting systems (9) of the advancing roller are centrally controllable.

15. The roller frame (1) according to claim 12, wherein a transmission (14) is provided between the pinion (11) and the motor (12) of the adjusting system (9).

16. The roller frame (1) according to claim 15, wherein the transmission (14) is a planetary gear.

17. The roller frame (1) according to claim 12, wherein the motor (12) is a servomotor.

18. The roller frame (1) according to claim 12, wherein three rollers (2, 3, 15) are provided, of which at least two rollers (2, 15) are advancing rollers.

19. The roller frame (1) according to claim 12, wherein advancing roller (2, 15) is supported so that it can be moved crosswise relative to the roller (2) to compensate for the deflection.

20. The roller frame (1) according to claim 12, wherein the distance between the pinion (11) and the rack (10) is changed by a cam mechanism acting on the pinion (11).

* * * * *